United States Patent
Weisbrod

(10) Patent No.: US 7,654,778 B2
(45) Date of Patent: Feb. 2, 2010

(54) VACUUM SYSTEM FOR PICKUP UNIT

(75) Inventor: Vincent Weisbrod, Baldwinsville, NY (US)

(73) Assignee: D & W Diesel, Inc., Auburn, NY (US)

( * ) Notice: Subject to any disclaimer, the term of this patent is extended or adjusted under 35 U.S.C. 154(b) by 580 days.

(21) Appl. No.: 11/624,461

(22) Filed: Jan. 18, 2007

(65) Prior Publication Data

US 2007/0177950 A1    Aug. 2, 2007

Related U.S. Application Data

(60) Provisional application No. 60/759,792, filed on Jan. 18, 2006.

(51) Int. Cl.
*B65G 53/46* (2006.01)

(52) U.S. Cl. .................... 406/127; 406/41; 406/43; 406/145; 406/169

(58) Field of Classification Search .......... 406/39, 406/41, 43, 109, 122, 123, 127, 141, 142, 406/145, 146, 163, 169, 170
See application file for complete search history.

(56) References Cited

U.S. PATENT DOCUMENTS

| | | | | |
|---|---|---|---|---|
| 3,205,017 A * | 9/1965 | Story et al. | ................. | 406/116 |
| 4,352,608 A * | 10/1982 | Stuller et al. | ................ | 406/116 |
| 4,718,796 A * | 1/1988 | Shiers et al. | .................. | 406/34 |
| 5,016,717 A | 5/1991 | Simons et al. | | |
| 5,199,826 A * | 4/1993 | Lawrence | .................... | 406/41 |
| 5,580,193 A * | 12/1996 | Battle et al. | .................... | 406/41 |
| 5,639,188 A * | 6/1997 | Howanski et al. | .......... | 406/151 |
| 5,868,528 A * | 2/1999 | Howanski et al. | .......... | 406/151 |
| 6,089,795 A * | 7/2000 | Booth | ......................... | 406/43 |
| 6,152,656 A * | 11/2000 | Curtis et al. | .................. | 406/34 |
| 6,343,896 B1 * | 2/2002 | Goodier et al. | ............... | 406/43 |
| 6,454,496 B1 * | 9/2002 | Mills et al. | .................... | 406/41 |
| 7,094,004 B2 * | 8/2006 | Dunlop et al. | ................ | 406/68 |
| 7,101,120 B2 * | 9/2006 | Jurkovich | .................... | 406/12 |
| 7,303,362 B2 * | 12/2007 | Dunlop et al. | ................ | 406/42 |
| 7,413,388 B2 * | 8/2008 | Krebs, Claus | ............... | 406/55 |
| 7,431,537 B2 * | 10/2008 | Francis et al. | ................. | 406/53 |
| 2003/0131571 A1 | 7/2003 | Demarco | | |

* cited by examiner

*Primary Examiner*—Douglas A Hess
(74) *Attorney, Agent, or Firm*—George R. McGuire; Bond Schoeneck & King, PLLC

(57) ABSTRACT

An improved system for the moving material into and out of a trailer attached to a truck that is equipped with first and second high pressure hydraulic circuits, an airlock circuit, and a low pressure return line. The improvement to the system generally includes a selector valve that is operable between load and unload positions, and a blower and motor that are mounted to the trailer's chassis and are fluidly driven by the high pressure circuits via the selector valve being in its load position. When in the unload position, the blower and motor are bypassed and the hydraulic circuits operate in their traditional manner.

10 Claims, 7 Drawing Sheets

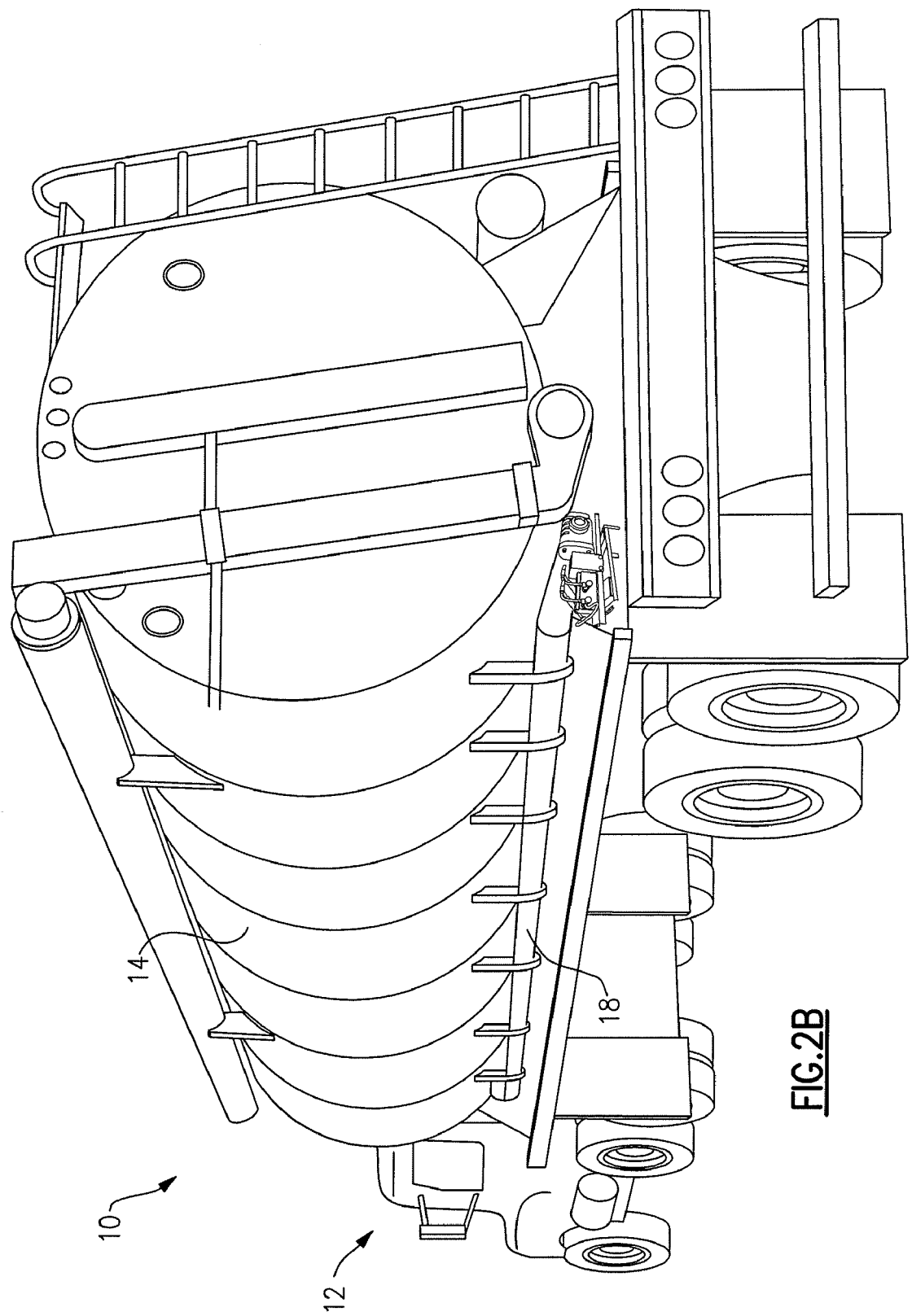

VACUUM SYSTEM FOR PICKUP UNIT

PRIORITY CLAIM

The present application claims priority to U.S. Provisional Patent Application Ser. No. 60/759,792, filed Jan. 18, 2006, the entirety of which is hereby incorporated by reference.

BACKGROUND OF THE INVENTION

1. Field of Invention

The present invention relates generally to blowers for use in conjunction with loading/unloading contents into/out of tractor trailers, and more specifically to hydraulically driven blower systems for moving bulk feed into/out of a pickup trailer.

2. Description of Prior Art

Bulk material, such as feed, is generally transported in tractor trailers having several independently accessible compartments formed in the trailer. A pneumatic/hydraulic vacuum system driven by the power take-off on the truck is provided for powering a motor that energizes a floor auger that moves the material towards a discharge auger, and the discharge auger that moves the material to/from the compartments. The trailers are typically equipped with dual hydraulic circuits of 20-25 gpm each which can operate at a maximum of 2500 psi, without a blower, and the trailer includes two hydraulic circuits; one for the floor auger and the other for the discharge auger.

This arrangement therefore requires two individual hydraulic circuits to unload the trailer through the discharge auger system, and the trailer further requires at least one hydraulic circuit to drive an airlock during the vacuum loading operation ("pickup" operation). A blower that can power a standard system needs to be rated at least at 800 cfm, thus requiring at least 40-50 gpm at 2500 psi of horsepower.

SUMMARY OF THE INVENTION

A vacuum system for a pickup unit comprising a user actuated selector valve that is operable between load and unload positions. In the "load" position, the valve directs the existing high pressure lines on the pickup unit to actuate a motor and blower that creates a negative pressure and causes the typical pickup hose to draw material from a customer's storage bin through the pickup unit's conventional load circuitry. In the unload position, the valves direct auger to unload the compartments and deliver material to the customer's storage bin while the blower is at rest. The user actuated selector valve is preferably mounted as close to the driver's compartment as reasonably possible.

In one aspect of the invention, there is provided an improved system for moving material into and out of a trailer attached to a truck that is equipped with first and second high pressure hydraulic circuits, an airlock circuit, and a low pressure return line. The improvement to the system generally comprises a selector valve having first and second inputs for receiving the first and second high pressure hydraulic circuits, respectively, and respective first and second load outputs and first and second unload outlets. The selector valve is selectively operable between load and unload positions, wherein when in the load position the first and second inputs are fluidly connected to the first and second load outlets, respectively, and when in the unload position the first and second inputs are fluidly connected to the first and second unload outputs, respectively. The improvement further generally comprises a motor having first and second inputs that are fluidly connected to the first and second load outputs of the selector valve, and first and second outputs respectively connected to the low pressure return line and the airlock circuit, respectively. Finally, the improvement generally further comprises a blower operatively connected to the motor.

BRIEF DESCRIPTION OF THE DRAWINGS

The present invention will be more fully understood and appreciated by reading the following Detailed Description in conjunction with the accompanying drawings, in which:

FIGS. 2A and 2B are annotated perspective views of the rear of a typical vacuum pick up unit;

DETAILED DESCRIPTION

Figure 1:
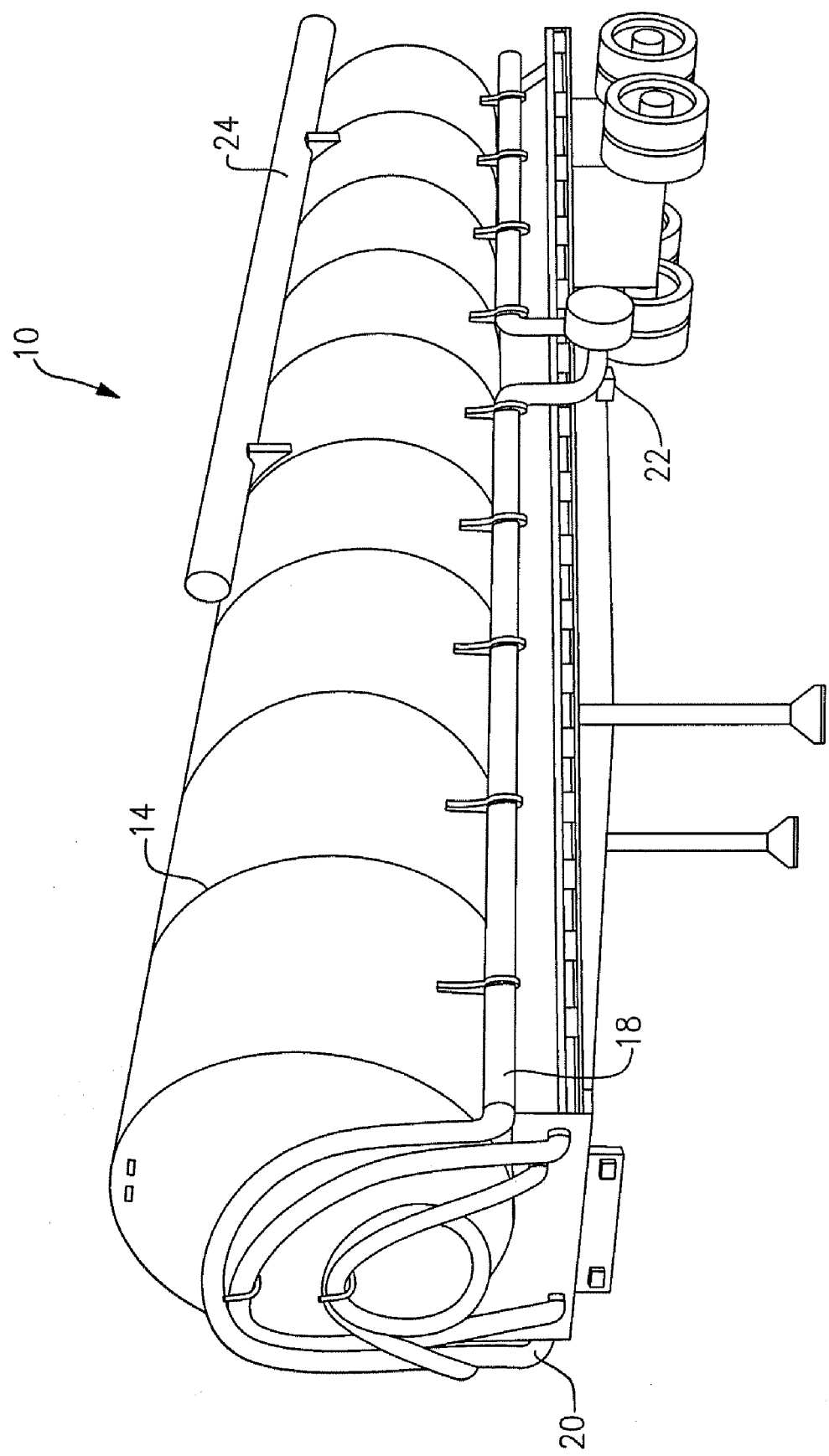
FIG. 1 is an annotated perspective view of the front of a typical vacuum pick up unit.
Figure 2A:
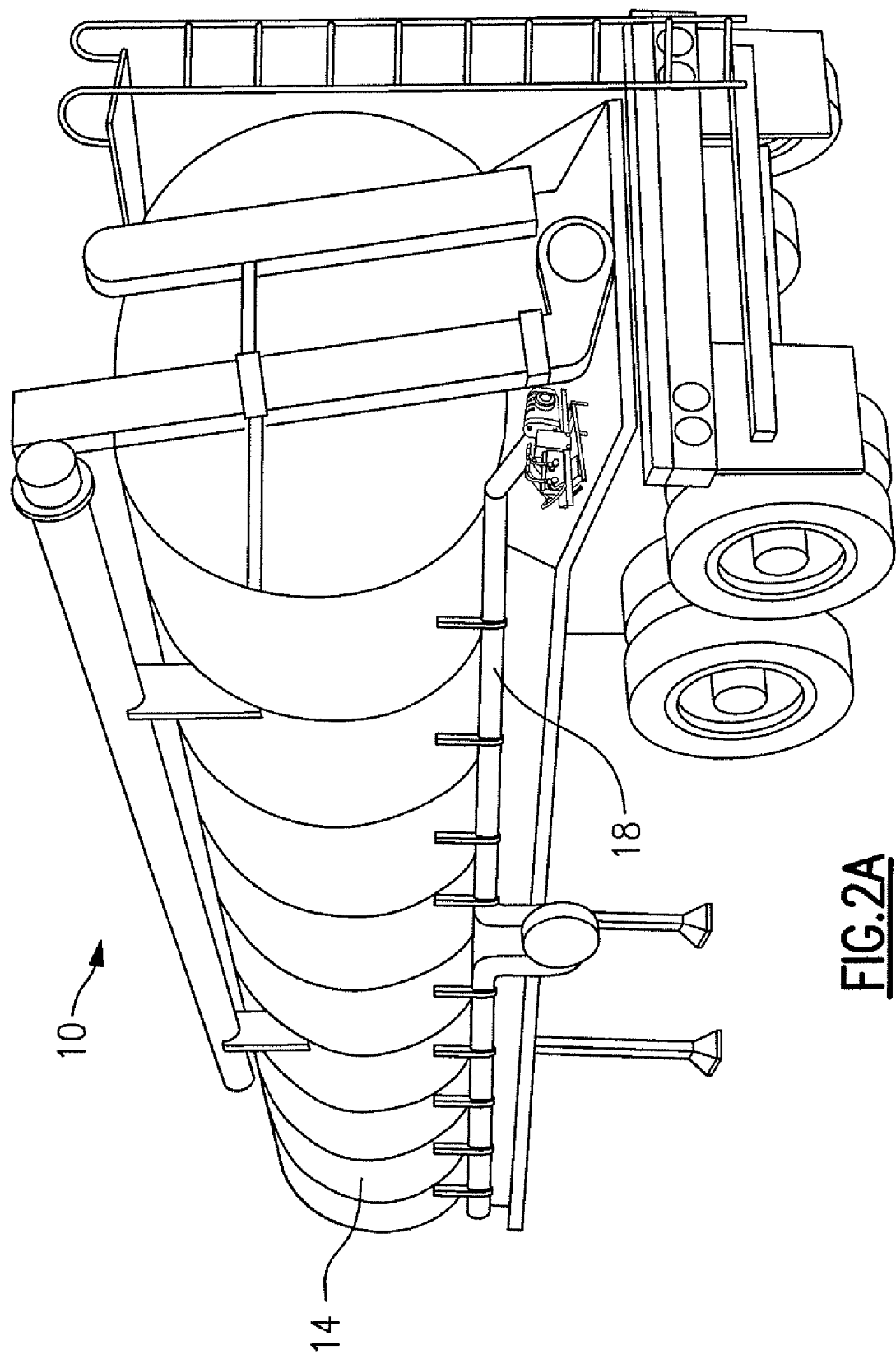

Referring now to the drawings, wherein like reference numerals refer to like parts throughout, there is seen in FIGS. 1 and 2 a material transport truck 10 having a tractor 12 and a trailer 14 that is adapted to carry loads of material in a plurality of segmented compartments 16. Material, such as feed, is generally delivered to a customer and emptied into a silo or similar storage structure. When delivering the new material to the customer, generally old, unusable material that is present in the storage structure is removed by a vacuum system and deposited into a section of trailer 14, and then new material is delivered into the silo from trailer 14.

The present invention provides a system for installation on truck 10 that effectively discharges to and recovers feed or other material from a storage tank, such as a silo without requiring modification to the airlock hydraulic circuitry and controls, no changes to the operator instructions for operation of the pickup unit, and a single driver input that is easily accessible to the driver. Truck 10 is equipped with a conventional hydraulic system 12, including hydraulic lines 17 and both a vacuum air line 18 and a pressure air line 20. Tractor 12 includes dual hydraulic circuits 22, 24, without a blower, and the trailer 14 includes two hydraulic systems; one high pressure line 26 for the floor auger and one high pressure line 28 coming from tractor 12 for the discharge auger circuit.

Figure 3:
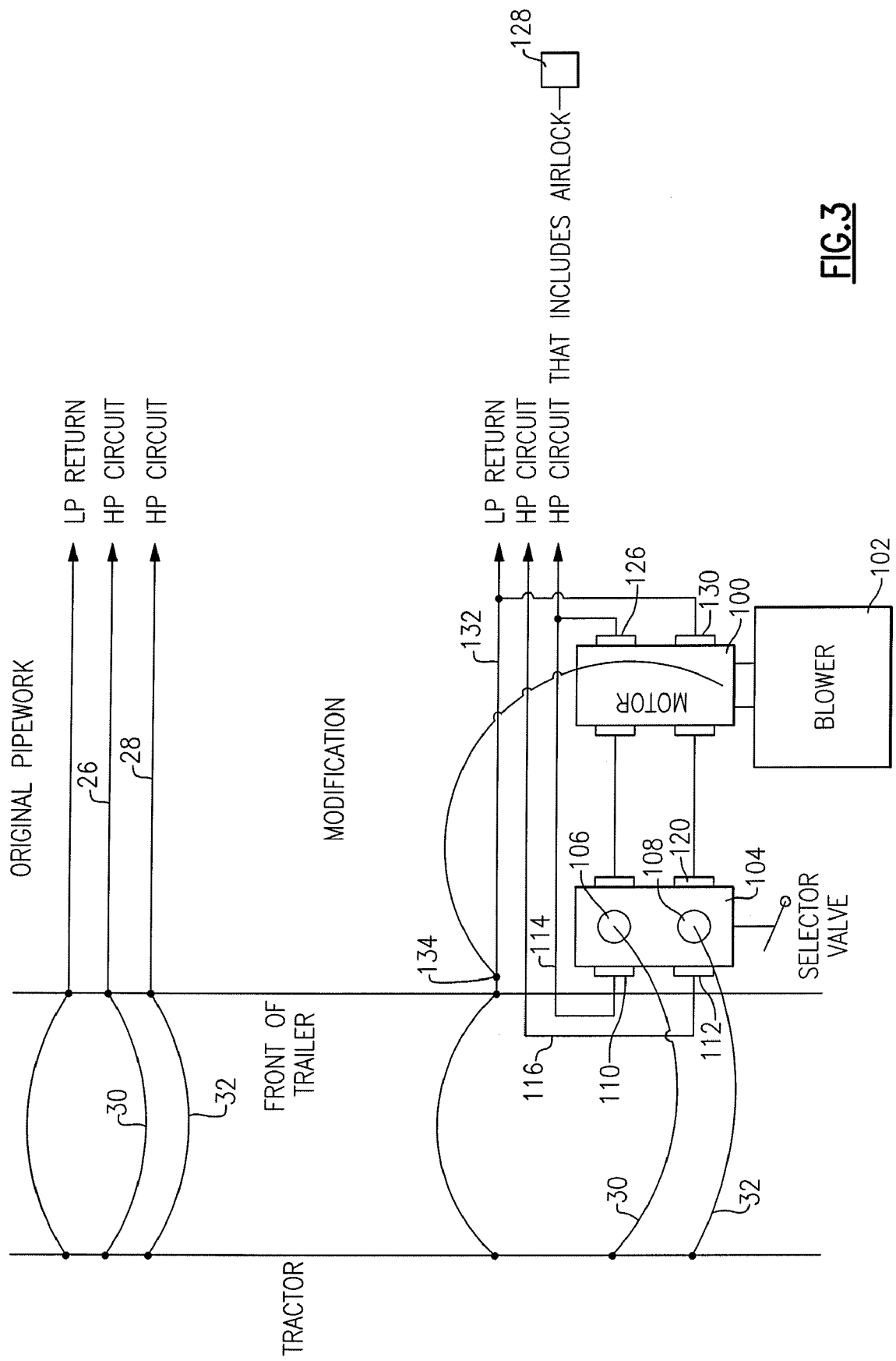
FIG. 3 is a schematic side by side illustration of the original and modified pipework, respectively, for a vacuum system.
Figure 4:
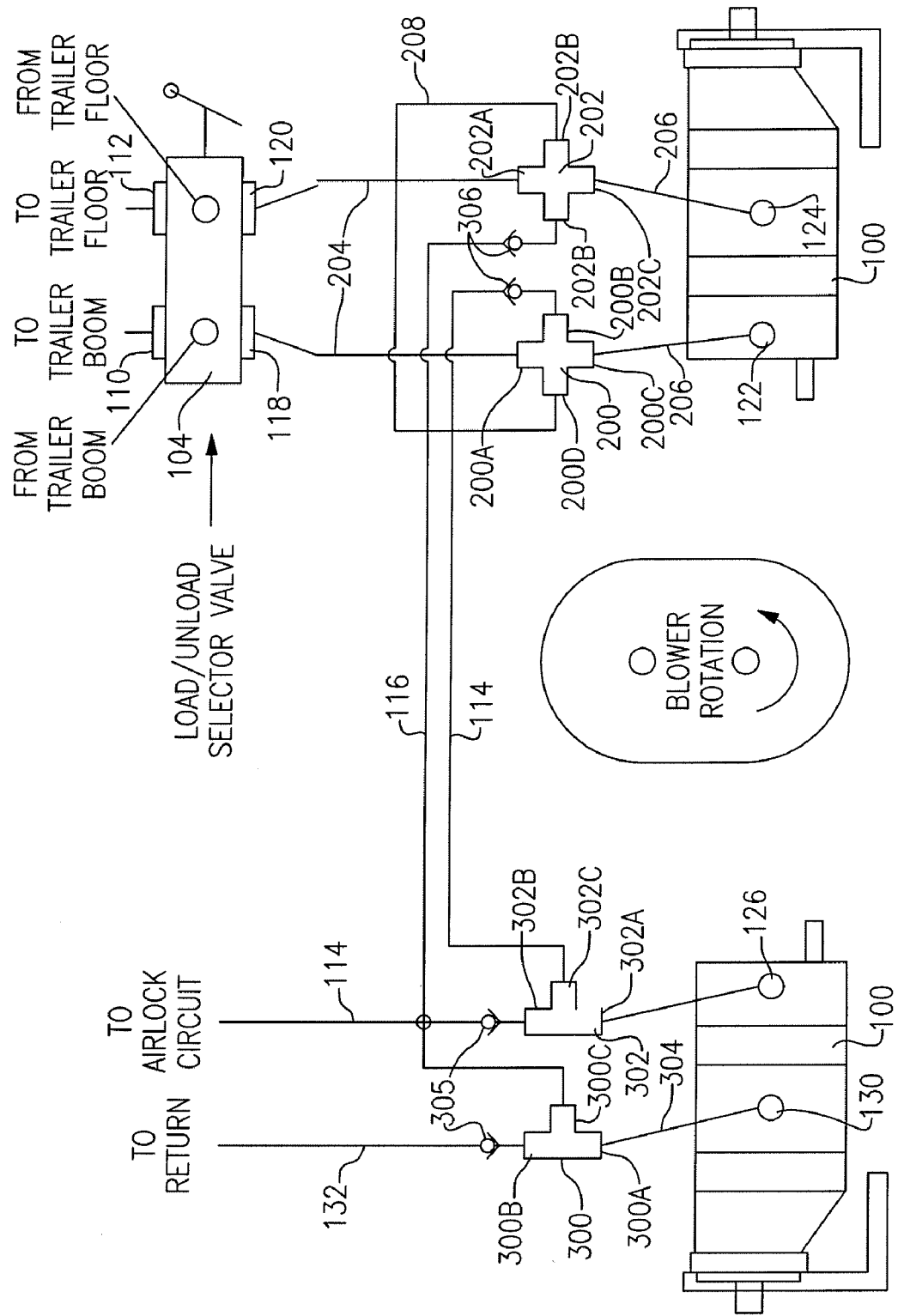
FIG. 4 is a schematic illustration of the modified vacuum system.
Figure 5:
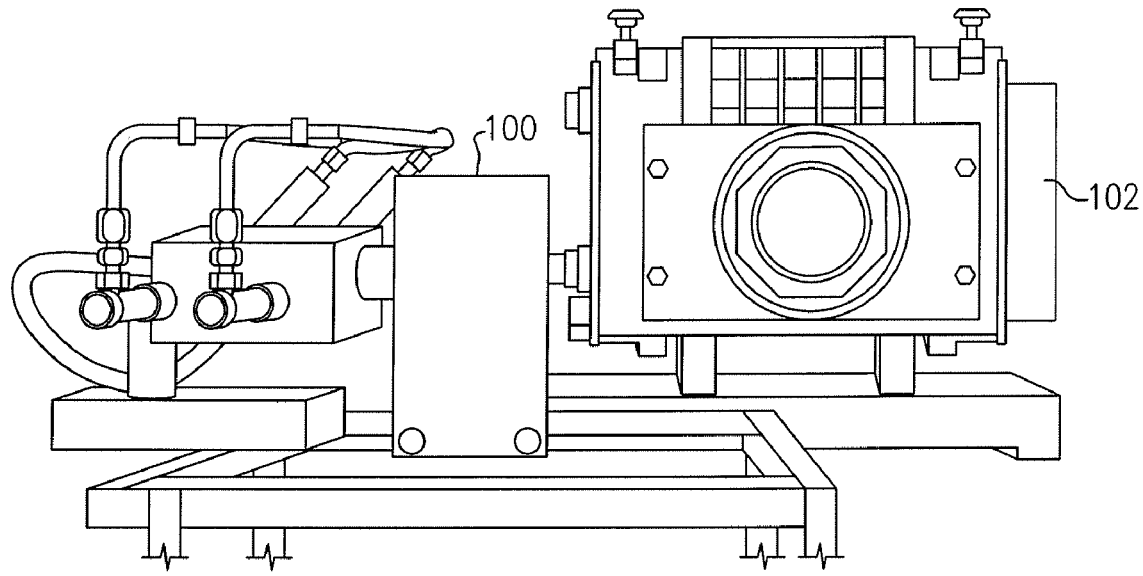
FIG. 5 is an elevation view of the blower and return side of the hydraulic connections.
Figure 6:
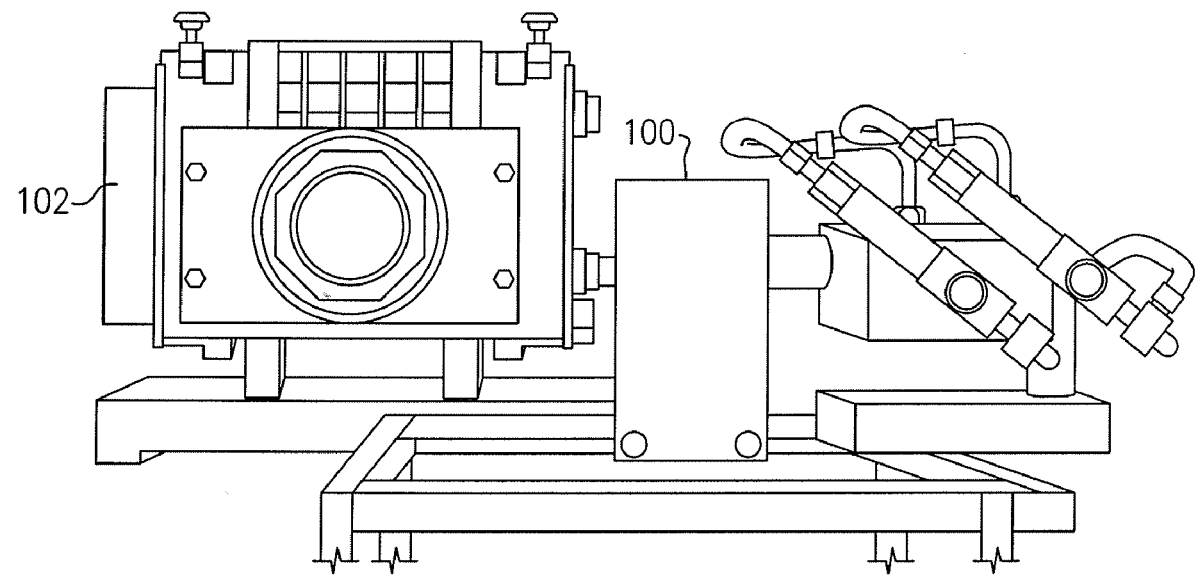
FIG. 6 is an elevation view of the blower and pressure side of the hydraulic connections.
Figure 8:
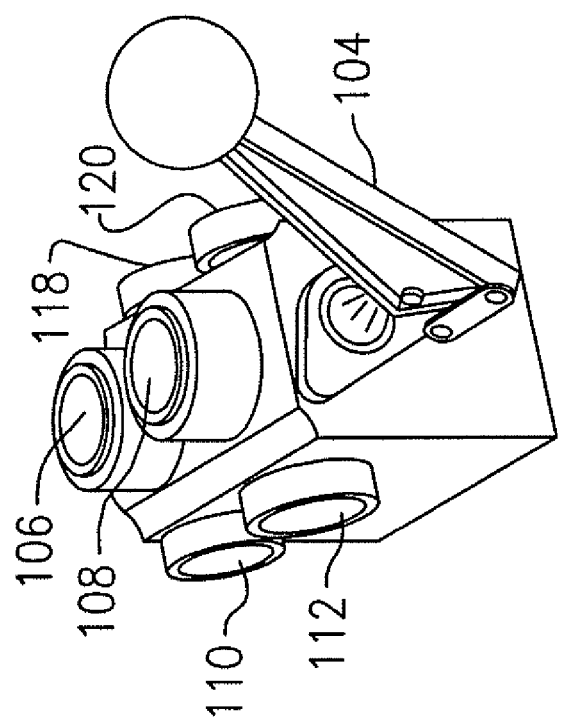
FIG. 8 is a perspective view of the user actuated selector valve.
Figure 7:
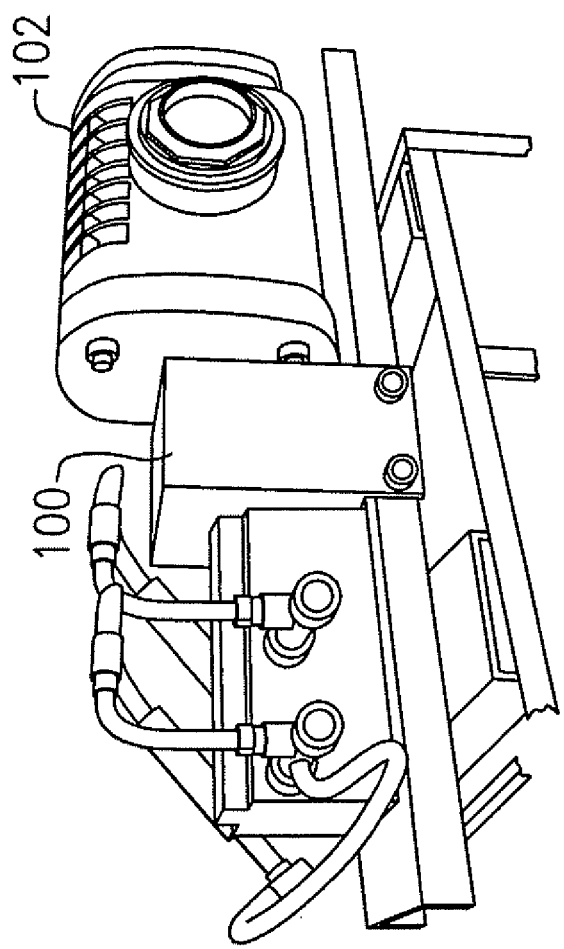
FIG. 7 is a perspective view of the blower and return side of the hydraulic connections with the direction of oil and blower air flow illustrated.

With reference to FIG. 3, a conventional system is modified with the present invention by adding a hydraulically driven motor 100 and blower 102 to the system, as well as a user actuated selector valve 104. To facilitate the system of the present invention, first the trailer end of the tractor trailer jumper hoses 30, 32 are relocated to inlet ports 106, 108 of selector valve 104. Second, one pair of the selector valve outlet ports 110, 112 are connected to the existing trailer high pressure piping 114, 116, noting that it is important to maintain the continuity of the discharge auger and floor auger circuits from the tractor through the trailer. Third, the other pair of selector valve outlet ports 118, 120 are connected to inlet ports 122, 124 of motor 100. Fourth, the motor return port 126 (farthest from blower 102) is connected to the trailer's high pressure line 114 that feeds the airlock control and motor 128, noting that a check valve is installed in this line with the direction of flow away from motor 100. Fifth, the motor return port 130 closest to blower 102 is connected to the trailer's low pressure return line 132, with a check valve being installed in this line with the direction of flow away from motor 100. Sixth, the small motor case drain 134 is connected to the trailer's low pressure return line 132 as close to the front of trailer 12 as reasonably possible. An optional hydraulic accumulator may be installed in low pressure line 132. When the "load" option is selected on valve 104, both hydraulic circuits 26, 28 remain separated through motor 100. Both sections combined drive blower 102.

More specifically, a pair of four way valves 200, 202, each having four ports (200A-D, and 202A-D) are fluidly connected between selector valve outlet ports 118, 120 (connected to ports A via lines 204) and inlet ports 122, 124 of motor 100 (connected to ports C via lines 206), respectively. For purposes of balancing the flow between the two sections of motor 100, ports B of valves 200 and 202 are interconnected by a balance line 208.

In addition, three way valves 300, 302, each having three ports (300A-C, 302A-C) are fluidly connected between motor return port 130 (to port 300A) and the trailer's low pressure return line 132 (to port 300B) via line 304 and motor return port 126 (to port 302A) and the trailer's high pressure line 114 (to port 302B) that feeds the airlock control, respectively. Ports 300C, 302C are connected to ports 200C and 202C, respectively, with a check valve 306 installed in those lines to prevent the backflow of fluid into blower 100, and to permit the blower to coast down to a stop when selector valve is moved from the load to the unload position.

What is claimed is:

1. An improved system for moving material into and out of a trailer attached to a truck that is equipped with first and second high pressure hydraulic circuits, an airlock circuit, and a low pressure return line, said improvement comprising:
   a. a selector valve having first and second inputs for receiving said first and second high pressure hydraulic circuits, respectively, and respective first and second load outputs and first and second unload outputs, said selector valve being selectively operable between load and unload positions, wherein when in said load position said first and second inputs are fluidly connected to said first and second load outputs, respectively, and when in said unload position said first and second inputs are fluidly connected to said first and second unload outputs, respectively;
   b. a motor having first and second inputs that are fluidly connected to said first and second load outputs of said selector valve, and first and second outputs respectively connected to the low pressure return line and the airlock circuit, respectively; and
   c. a blower operatively connected to said motor.

2. The improved system of claim 1, further comprising first and second four way valves having first, second, third and fourth ports, positioned in fluidly connected relation between said selector valve and said motor.

3. The improved system of claim 2, wherein said first ports of said first and second four way valves are fluidly connected to said first and second load outputs of said selector valve, respectively, and said second ports are fluidly connected to said first and second inputs of said motor, respectively.

4. The improved system of claim 3, wherein said third ports of said first and second four way valves are fluidly connected to one another.

5. The improved system of claim 3, further comprising means for balancing the flow between said first and second inputs to said motor.

6. The improved system of claim 5, wherein said flow balancing means comprises said third ports of said four way valves and are fluidly connected to one another.

7. The improved system of claim 3, further comprising first and second three way T-valves each having first, second and third ports, and being positioned between said first motor outlet and said low pressure return, and between said second motor outlet and said airlock circuit, respectively.

8. The improved system of claim 7, wherein said fourth ports of said first and second four ways valves are respectively, fluidly connected to said first ports of said three way valves.

9. The improved system of claim 8, further comprising first and second check valves positioned in fluid communication paths between said first ports of said first and second three way valves and said first and second fourth ports of said first and second four way valves, respectively.

10. The improved system of claim 7, wherein said second ports of said first and second three way valves are fluidly connected to said first and second outlets of said motor, respectively, and said third ports of said first and second three way valves are fluidly connected to said low pressure return and said airlock circuit, respectively.

* * * * *